United States Patent [19]

Avila et al.

[11] Patent Number: 4,666,372

[45] Date of Patent: May 19, 1987

[54] COMPOSITE TORSION LINK

[75] Inventors: Jose A. Avila, Henrietta, N.Y.; Steven L. Odobasic, 1324 S. Shore Drive, Apt. 703, Erie, PA 16505

[73] Assignee: Steven L. Odobasic, Erie, Pa.

[21] Appl. No.: 714,187

[22] Filed: Mar. 20, 1985

[30] Foreign Application Priority Data

Sep. 26, 1984 [GB] United Kingdom ................. 8424247

[51] Int. Cl.$^4$ ..................... B64C 27/33; B64C 27/35
[52] U.S. Cl. ........................... 416/134 A; 74/579 R;
267/57.1 A; 416/141
[58] Field of Search ..................... 267/57.1 A, 57.1 R;
74/579 R, 581; 416/134 A, 141

[56] References Cited

U.S. PATENT DOCUMENTS

| | | | |
|---|---|---|---|
| 3,370,483 | 2/1968 | Ditlinger | 74/579 |
| 3,411,379 | 11/1968 | Deyerling | 74/579 |
| 3,475,988 | 11/1969 | Ditlinger et al. | 74/579 R |
| 3,603,173 | 9/1971 | Brooks | 74/581 |
| 3,669,566 | 6/1972 | Bourquardez et al. | 416/134 |
| 3,692,361 | 9/1972 | Ivarsson | 74/579 X |
| 3,762,834 | 10/1973 | Bourquardez et al. | 416/134 A |
| 3,765,267 | 10/1973 | Bourquardez et al. | 74/581 |
| 3,782,220 | 1/1974 | Ditlinger | 74/579 R |
| 3,791,234 | 2/1974 | Kastan et al. | 416/141 X |
| 3,977,274 | 8/1976 | Ditlinger | 74/579 R |
| 4,183,261 | 1/1980 | Eiselbrecher et al. | 416/134 A X |
| 4,195,967 | 4/1980 | Weiland | 416/134 |
| 4,222,709 | 9/1980 | Mouille | 416/134 |
| 4,345,876 | 8/1982 | Schwarz et al. | 416/134 |
| 4,352,631 | 10/1982 | Buchs et al. | 416/134 A |
| 4,455,123 | 6/1984 | Sanders et al. | 416/134 A |
| 4,521,003 | 6/1985 | Odobasic | 416/134 A X |

Primary Examiner—Everette A. Powell, Jr.
Attorney, Agent, or Firm—Howson and Howson

[57] ABSTRACT

A flexurally, axially and transversely stiff link for providing a connection of low torsional stiffness between structural elements. The link includes an elongate flexurally stiff tapered beam extending longitudinally inside a filament-wound composite tube of low torsional stiffness and an elastomeric bearing interposed between the small end of the beam and the tube. An inboard connector assembly connects the beam and tube to one of the structural elements, and an outboard connector assembly connects the tube to the other structural element. Tensile loads are carried by the tube; however, when torque is applied, the elastomeric material permits the tube to twist relative to the beam while enabling shear loads to be transferred therebetween. Modified embodiments of links having enhanced flexural and tensile load carrying capabilities are disclosed.

33 Claims, 7 Drawing Figures

COMPOSITE TORSION LINK

FIELD OF THE INVENTION

The present invention relates to mechanical elements of composite construction, and more particularly, the present invention relates to links of low torsional stiffness for use in providing connections capable of carrying axial, flexural and shear loads.

BACKGROUND OF THE INVENTION

There are many applications where so-called composite structures find utility. For instance, filament-reinforced composite materials are utilized to provide strong lightweight aircraft components. One of the most demanding applications for a composite aircraft component is in providing a link for connecting a rotor to a hub in a helicopter rotor system.

In connecting a rotor to a hub, the link must be capable of sustaining not only the substantial axial loads imparted by the centrifugal force acting on the rotor but also two plane bending and shear loads. In addition, the link must also have sufficiently low torsional stiffness as to permit the attack angle of the rotor to be adjusted as it rotates. A satisfactory composite link should also be light in weight, have a long service life, be relatively failsafe, and be capable of being manufactured economically.

It is known that in designing a composite tubular member for use as a torsion link, it is desirable for the filaments to be wound at a low angle, i.e. for the filaments to extend substantially axially, relative to the longitudinal axis of the link to provide a tubular structure which is strong in tension and flexurally stiff. Such a disposition of filaments, however, causes the tubular structure to have a relatively low shear stiffness. While shear stiffness can be increased by increasing the winding angle, increasing the winding angle also increases the torsional stiffness of the structure and reduces its flexural stiffness. Because of this, it has been difficult to design a filament-wound tubular composite torsion link which is axially strong, stiff in flexure and transverse shear, and low in torsional stiffness.

BRIEF DESCRIPTION OF THE PRIOR ART

Composite torsion links fabricated of filaments bonded together in a suitable matrix are known. Examples of such links are disclosed in U.S. Pat. Nos. 3,765,267 and 3,669,566 to Bourquardez et al., and in U.S. Pat. Nos. 4,195,967; 4,222,709; and 4,345,876. U.S. Pat. Nos. 3,370,483 and 3,411,379 are exemplary of patents disclosing wire wound tension torsion tie bars wherein flexible polyurethane is used to bond the wires together. While each of these patented links may function satisfactorily for its intended purpose, there is a continuing need for a strong, lightweight, composite torsion link that can be manufactured economically.

OBJECTS OF THE INVENTION

With the foregoing in mind, it is an object of the present invention to provide a novel link which is axially strong, which is stiff in flexure and transverse shear, and which has low torsional stiffness.

Another object of the present invention is to provide an improved torsion link which is strong, light in weight, and capable of being manufactured readily.

An object of the present invention is to provide a composite torsion link having a high flexural to torsional stiffness ratio.

A still further object of the present invention is to provide a torsion link of composite construction which overcomes the limitations of known composite torsion links.

Yet another object of the present invention is to provide an improved tubular low winding angle composite structure which undergoes a relatively small deflection under shear load.

It is an object of the present invention to provide a torsion link of composite construction for use in connecting rotors to hubs in a variety of applications where strong couplings of low torsional stiffness are required, such as helicopter and windmill rotor systems.

SUMMARY OF THE INVENTION

More specifically, the present invention provides a torsion link which is strong in tension, stiff in flexure and transverse shear, and low in torsional stiffness. The link includes an elongate flexurally stiff tapered beam surrounded by a tube having a torsional stiffness less than that of the beam and connected thereto by an elastomeric bearing. The elastomeric bearing permits the tube to twist relative to the beam when torque is applied to the tube. A first end connector assembly connects one end of the beam and tube to one structural element, such as a helicopter rotor drive assembly, and a second end connector assembly connects the tube to another structural element, such as a rotor blade which applies axial, transverse and flexural loads to the link. Preferably, the tube is fabricated of high strength substantially axially extending filaments bonded together in a flexible matrix, and a body of elastomeric material is disposed between the beam and the inside of the tube for elastically supporting the tube for a substantial portion of its length. The elastomeric bearing is mounted on the smaller end of the beam and may be either of the radial type for transferring shear loads or of the conical type for transferring tensile and shear loads, or the elastomeric bearing may be composed of a pair of axially spaced laminated bearings one of which may be of the conical type to accept tensile loads. In one embodiment, a tubular cuff surrounds the tube between the end connector assemblies and is connected to one end fitting by means of an elastomeric bearing to permit the end connector assemblies to rotate relative to one another about the longitudinal axis of the beam while transferring bending induced differential shear loads therebetween.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
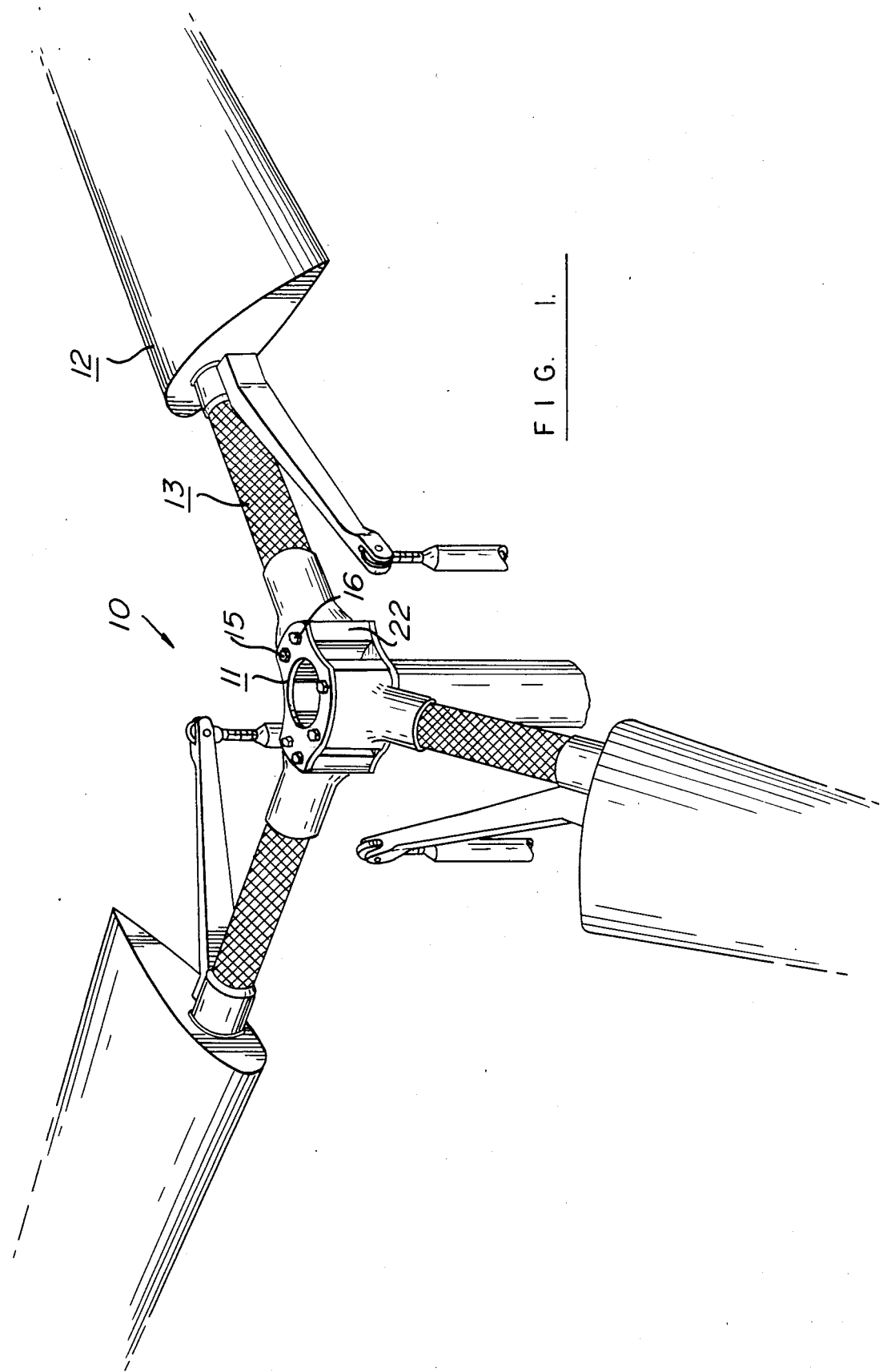
FIG. 1 is a fragmentary perspective view of a helicopter rotor system utilizing composite torsion links embodying the preseent invention.

Referring now to the drawings, FIG. 1 illustrates a helicopter rotor system 10 in which composite torsion links of the present invention find particular utility. The rotor system 10 comprises a drive shaft flange assembly 11 and a rotor 12 connected thereto by a torsion link 13 of the present invention. In operation, the torsion link 13 is subjected principally to tensile loads due to the centrifugal force imparted thereto by the rotor 12, to flexural loads in a vertical plane and a horizontal plane, to transverse shear loads in the vertical plane due to the lift produced by the rotor, and to transverse shear loads in the horizontal plane due to drag produced by the rotor. In addition to sustaining these principal forces, the torsion link 13 must accommodate torsional movement of the rotor 12 relative to the drive assembly 11 to permit the rotor 12 to twist about its longitudinal axis.

Figure 2:
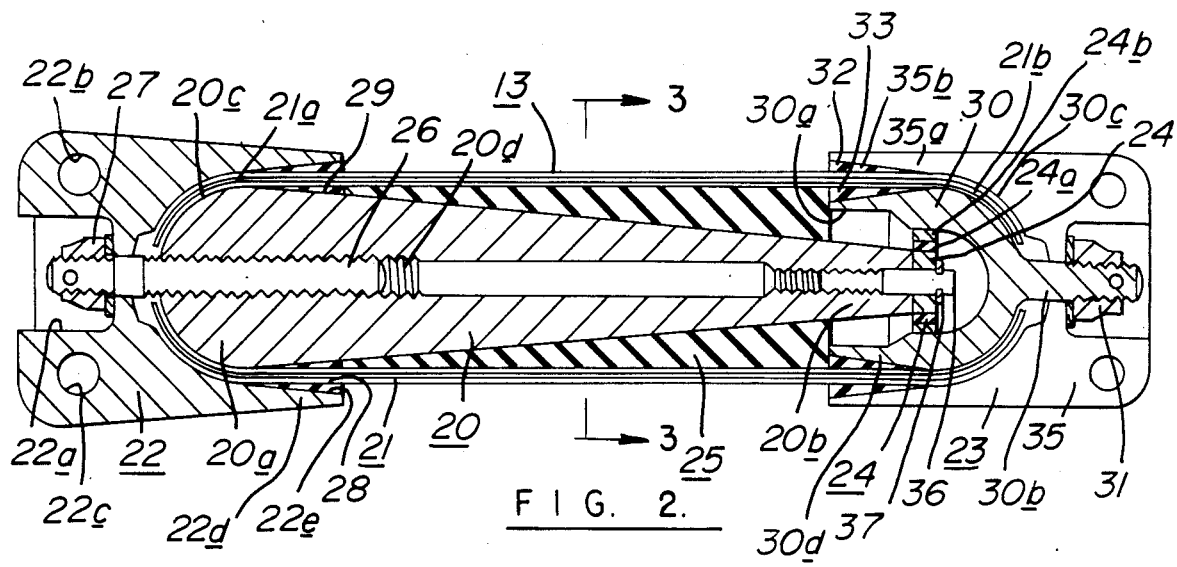
FIG. 2 is a longitudinal sectional view of one of the links illustrated in FIG. 1.

The present invention provides an improved torsion link which meets the aforementioned requirements with a relatively lightweight structure which can be manufactured readily. To this end, as best seen in FIG. 2, the tension torsion link 13 comprises an elongate flexurally stiff beam 20 which tapers in the axial direction from an enlarged inboard end 20a to a smaller outboard end 20b. A tube 21 of low torsional stiffness relative to the beam 20 surrounds the beam 20 and extends along its length between a first, or inboard, connector assembly 22 and a second, or outboard, connector assembly 23. An elastomeric bearing assembly 24 is mounted on the small outboard end 20b of the beam 20 and cooperates with the tube 21 and outboard connector assembly 23 to permit the tube 21 and outboard connector assembly 23 to rotate relative to the inboard connector assembly 22 about an axis coaxial with the beam 20. A body of elastomeric material 25 extends along the beam 20 and engages the inside of the tube 21 for elastically supporting the same along substantially its entire length.

The beam 20 in the disclosed embodiment has an annular cross-section (FIG. 3) and tapers in the axial direction at a suitable rate, which can be constant as illustrated or variable, between its large inboard end 20a and its smaller outboard end 20b. The inboard end 20a of the beam 20 is preferably provided with a hemispherical-shaped surface 20c which engages the inside of the inboard wrapped end portion 21a of the tube 21 throughout a substantial portion of its arcuate extent, such as illustrated in FIG. 2. The inboard end 20a of the beam 20 is provided with an axial threaded bore 20d which threadedly receives a high tensile strength stud 26. The stud 26 extends axially of the beam 20 beyond the end wrapped portion 21a of the tube 21. The stud 26 is received in a recess 22a in the end connector 22 and is fastened thereto by a nut 27. The end connector 22 is adapted to be secured to a structural element, such as between the rotor drive assembly flanges 11, by a pair of bolts 15 and 16 which pass downwardly through a pair of through bores 22b and 22c in the end connector 22.

For distributing shear stresses between the beam 20 and inboard end connector 22, the end connector 22 has a cylindrical sleeve 22d which surrounds the wrapped end portion 21a of the tube 21 and extends axially thereof for a slight distance along the outer periphery of the tube 21. The connector sleeve 22d has an internal tapered surface 22e defining a recess confronting the tube 21. The recess is filled with a layer of elastomeric material 28 to provide an elastic transverse connection between the connector sleeve 22d and the outside of the tube 21. A like inner layer of elastomeric material 29 is interposed between the inside of the tube 21 and the beam 20 opposite the outer layer 28. Thus, the connector 22 is fastened to the beam 20 and tube 21 in a manner permitting substantial flexural and shear loads to be applied to the beam 20 and thus to the rotor drive assembly 11.

Figure 3:
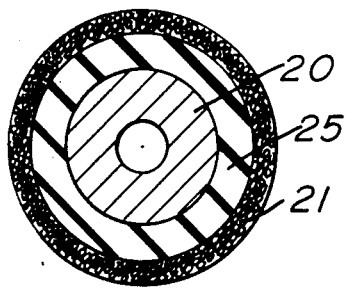
FIG. 3 is a transverse sectional view taken on line 3—3 of FIG. 2.

The outboard end connector assembly 23 is of two-piece construction including an inner fitting 30 having a cavity 30a which surrounds the outboard end 20b of the beam 20 and an outer connector member 35. The inner fitting 30 has a hemispheric surface 30c which engages inside the outboard wrapped axial end portion 21b of the tube 21. The fitting end surface 30c is of the same size as the beam end surface 20c, so that the tube 21 has a substantially constant circular transverse cross-section between its ends (FIG. 3). The inner fitting 30 has an axially extending threaded portion 30b connected to the outer connector member 35 by a nut 31. Like the inboard connector 22, the outboard connector 35 has a cylindrical peripheral sleeve 35a extending inboard around the tube 21 for a slight distance. The sleeve 35a is provided with a tapered surface 35b which is filled with a layer of elastomeric material 32 providing an elastic transverse connection. The inner fitting 30 also has a flange 30d provided with a tapered surface forming a recess in which a layer of elastomeric material 33 is interposed against the inside of the tube 21.

To transfer shear loads between the outboard end fitting assembly 35 and the beam 20 while permitting the outboard end portion of the tube 21 to twist with respect to the beam 20, the elastomeric bearing 24 is mounted inside the fitting 30 on the small end 20b of the beam 20. In the illustrated embodiment, the bearing 24 is secured on a stud 36 threaded into the outboard end of the beam 20, and is fastened thereto by a spring clip 37. The elastomeric bearing 24 is of conventional laminated construction and comprises at least one annular layer of elastomeric material 24a sandwiched between annular retainers 24b and 24c. The elastomeric bearing 24 is of the radial type and enables transverse shear loads applied to the outer fitting member 23 to be transferred to the beam 20 via the inner fitting 30. The elastomeric bearing 24 also enables the outboard connector assembly 23 to rotate coaxial with the axis of the beam 20 when the outboard end connector assembly 23 is twisted with respect to the inboard connector assembly 22.

For the purpose of elastically supporting the tube 21 internally during load application, a body of elastomeric material 25 is engaged between the outer periphery of the beam 20 and the inside of the tube 21 intermediate its ends. Preferably, the elastomeric material is a polyurethane of low shear modulus, below about 200 psi. Preferably, the elastomeric body 25 is substantially coextensive in length with the tube 21, extending between the end connector assemblies 22 and 23. The elastomeric body 25 elastically supports the tube 21 interiorly and stabilizes it against Brazier-type deformations in cross-sectional configuration during application of loads.

The link 13 is fabricated of strong lightweight materials. To this end, the beam 20 may be fabricated of high strength aircraft grade metal alloys, such as aluminum, titanium and the like; or, it may be fabricated of high strength composite materials such as carbon or boron filaments embedded in a rigid epoxy matrix.

The tube 21 is preferably fabricated of continuous filaments of either glass, aramid, graphite, boron or steel coated with a flexible bonding agent, such as an elastomeric material, including polyurethane having a low shear modulus, preferably below about 200 psi. The filaments of the tube 21 are wound at an acute, or low, winding angle with respect to the longitudinal axis of the beam 20. Preferably, the winding angle is very small, i.e. less than about 10°, and more preferably, the angle is less than about 4°.

The elastomeric member 25 interposed between the beam 20 and tube 21 is preferably fabricated of closed cell elastomeric foam and is molded into its illustrated hollow configuration. The member 25 is mounted on the beam 20 before the outboard end fitting 30 is applied onto the elastomeric bearing 24 and the tube 21 wound. If desired, the elastomeric material 25 may be a so-called high damping closed cell foam of polyurethane. Such a high damping elastomeric material is useful in attenuating oscillations between the beam 20 and tube 21.

In the illustrated embodiment, the beam 20 is of hollow circular, or annular, cross-section. If desired, however, beams of other cross-sections may be utilized, depending on the magnitudes of loads. For example, the beam may have either a solid or a hollow elliptical cross-section or it may have a cross-section of cruciform shape. Also, the cross-section of the tube may be varied depending on the magnitudes of loads.

In the disclosed embodiment, the tube 21 is of composite filament-wound construction of lower torsional stiffness than the beam 20. If desired, however, the tube 21 may be provided by a thin wall beam of open cross-section, such as one or more laminated longitudinally slit tubes which are also of low torsional stiffness relative to the beam. In such event, the end connector assemblies would have to be modified accordingly to accommodate the tube edge movement during torque application. Regardless of the composition of the tube 21, however, it should have a torsional stiffness which is in a range of 1/200 to 1/600 of the torsional stiffness of the beam 20.

In the embodiment of FIG. 2, axial tensile loads are reacted by the tube 21, and transverse shear loads are reacted by the beam 20 via its elastomeric bearing connection with the outboard end fitting assembly 23. The elastomeric bearing connection also accommodates the relative angular deflection between opposite ends of the tube 21 as torque is applied. In this embodiment, only moderate bending loads are carried by the tube 21 and beam 20.

Figure 4:
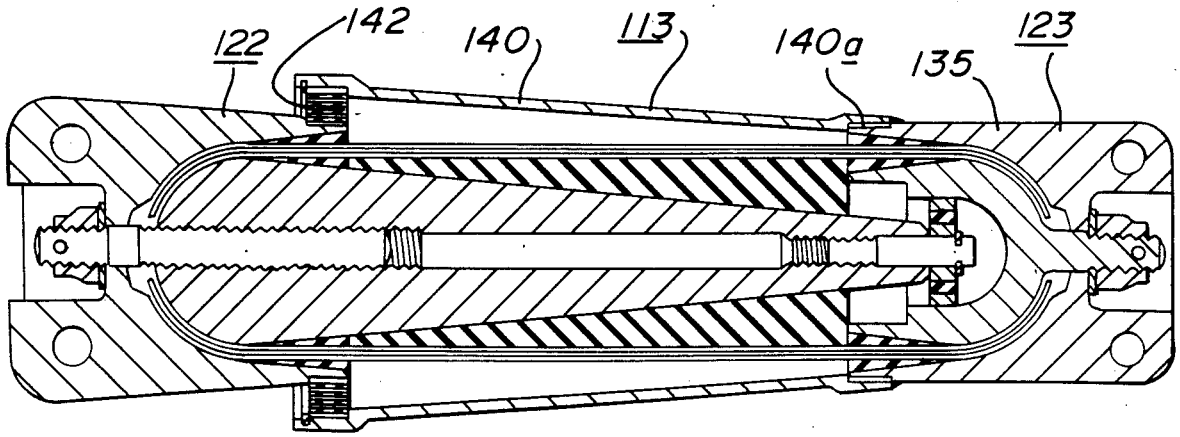
FIG. 4 is a longitudinal sectional view similar to FIG. 2 but illustrating a modified embodiment of the present invention.

In order to provide a link having increased flexural stiffness, capable of carrying substantial bending loads, a modified link 113 illustrated in FIG. 4 is provided. The modified link 113 is similar in all respects to the link 13 except for the presence of a tubular structural cuff 140 which surrounds the tube 21 and which extends between the inner and outer end connector assemblies 122 and 123, respectively. The outboard end 140a of the cuff 140 is rigidly fastened to the periphery of the outer end connector member 135 of the outboard connector assembly 123, as by electron-beam welding. The inboard end 140b of the cuff 140 is connected to the inboard end connector member 122 by means of a laminated radial elastomeric bearing 142. Thus, the structural cuff 140 increases the flexural stiffness of the link 113 while the elastomeric bearing 140 permits the outer end connector assembly 123 to twist relative to the inner end connector 122 when torque is applied. The cuff 140 also protects the tube 21 from damage.

Figure 5:
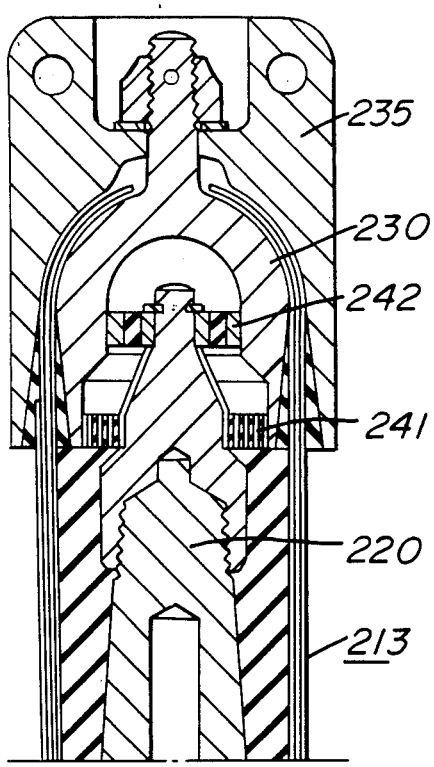
FIG. 5 is a fragmentary longitudinal sectional view of another modified embodiment of the present invention.

While the link 113 of FIG. 4 has a substantial amount of flexural stiffness rendering it useful for applications where substantial bending loads are to be carried, there are other ways to enhance the flexural stiffness and bending load carrying capability of the torsion link embodiment illustrated in FIGS. 1–3. For instance, as best seen in FIG. 5, a modified embodiment of a link 213, similar in all respects to the link 13 of FIG. 2 is provided. In this embodiment, however, the outer end of the beam 220 and end fitting 230 are modified to accommodate a pair of axially spaoed radial laminated elastomeric bearings 241 and 242. The spaced radial elastomeric bearings 241 and 242 permit a certain amount of flexural load to be transferred to the beam 220 from the end connector member 235.

Figure 6:
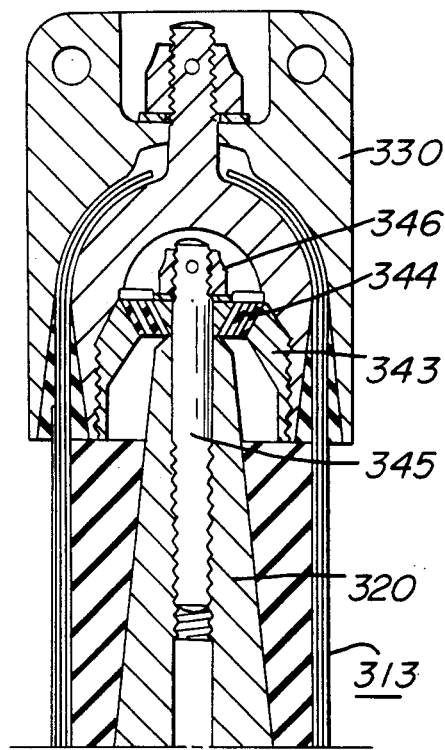
FIG. 6 is a fragmentary sectional view similar to FIG. 5 but illustrating yet another modified embodiment of the present invention.

If desired, another modified embodiment of the present invention may be provided with enhanced axial load carrying capabilities and some failsafe attributes. As best seen in FIG. 6, this modified link 313 is similar to the link 13 of FIG. 2, except that the end fitting 330 is provided with a threaded seat member 343 which engages a conical laminated elastomeric bearing 344 fastened to the small end of the beam 320 by means of a stud 345 and nut 346. The seat member 343 applies axial, tensile and transverse shear loads to the beam 320 via the conical elastomeric bearing 344 while permitting the outer end connector member 335 to rotate relative to the beam 320.

A still further modified embodiment of the present invention may be provided which has the capability of transferring axial and flexural loads to the beam in addition to shear loads as discussed heretofore. To this end, the modified link 413 (FIG. 7) is provided. The link 413 is similar in construction to the link 13, but the end fitting 430 threadedly receives an insert member 443 which mounts a pair of laminated elastomeric bearings 441 and 442 in axially spaced relation. One of the elastomeric bearings 441 is of the conical type, and the other elastomeric bearing 442 is of the radial type. The conical bearing 441 is fastened to the small end of the beam 420 via a beam extension 447 which is threaded at its outermost end to receive a nut 448. In this embodiment, flexural, tensile and transverse shear loads can be transferred to the beam 420 from the end connector member 435.

Figure 7:
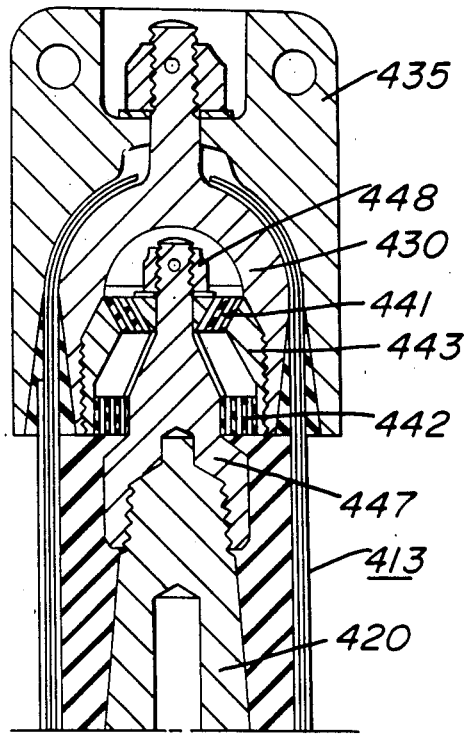
FIG. 7 is a fragmentary sectional view similar to FIGS. 5 and 6 but illustrating a further modified embodiment of the present invention.

If desired, each of the modified embodiments illustrated in FIGS. 5, 6 and 7 may be provided with a structural cuff and elastomeric bearing connected in the manner illustrated in FIG. 4 to enhance even further their bending load carrying capacity.

The links of the present invention provide a number of advantages when installed in a helicopter rotor system. First of all, they have low torsional stiffness to minimize pitch change control forces. For instance, for a light helicopter, the torsion links of the present invention can be designed to have a torsional stiffness of about 8 lb. in. per degree angular deflection. The links have high axial strength for sustaining centrifugal forces, and the internal beam accepts transverse shear loads, thereby relieving the tubular composite member of alternating shearing stresses and large shear deflections. The links have high flexural to torsional stiffness ratios, approaching 200, as compared with beamless composite links of the same construction which have flexural to torsional stiffness ratios in a range of 30 to 60. Thus, rotor tip deflection can be closely controlled. Moreover, optimum flexural stiffness can be obtained in the lead-lag and/or flapping planes by varying the cross-section of the beam and/or the tube. Also, since the elastomeric body in the space between the composite tube end beam strains as the tube rotates relative to the beam during pitch changes, making the elastomeric body of a high damping elastomeric material enables flapping and lead-lag dampers to be eliminated. The links also have high moments of inertia in the flapping and lead-lag planes, thereby enabling them to be designed with a natural frequency above the first harmonic. Because of their high flexural to torsional stiffness ratios, torsion links of the present invention are suitable for use in coaxial blade helicopters where separation between the tips of the two counterrotating blades must be controlled. The torsion links of the present invention are also useful in connecting rotors to hubs in windmills.

In view of the foregoing, it should be apparent that the present invention now provides an improved torsion link of low torsional stiffness and high axial, flexural and transverse strength.

Thus, while preferred embodiments of the present invention have been described in detail, various modifications, alterations and changes may be made without departing from the spirit and scope of the present invention as defined in the appended claims.

We claim:

1. A link for use in connecting structural elements, comprising:
    a flexurally stiff elongate beam having a predetermined torsional stiffness about a longitudinal axis,
    an axially stiff tube surrounding said beam and extending therealong in spaced relation therewith for a major portion of its length, said tube having a torsional stiffness lower than the torsional stiffness of said beam,
    first connecting means adapted to connect both said beam and tube at one end to one of said structural elements,
    second connecting means mounted inside said tube and rotatable relative to said beam about an axis coaxial with said beam axis and adapted to connect said tube at its other end to another of said structural elements for permitting tensile loads to be applied to said tube, and
    bearing means interconnecting at least said other end portion of said beam and said second connecting means for permitting said other end of said tube and said second connecting means to rotate together relative to said beam when torque is applied thereto and for permitting said second connecting means to transfer at least shear loads to said beam, whereby the beam and tube cooperate with the bearing means therebetween to provide a connection characterized by low torsional stiffness, high flexural stiffness, and high axial and transverse strength.

2. The link according to claim 1 wherein said tube includes filaments extending substantially axially of said link and bonded together in a flexible matrix.

3. The link according to claim 2 wherein said filaments extend at an angle of less than about 10° with respect to the longitudinal axis of said tube.

4. The link according to claim 2 wherein said flexible matrix includes polyurethane.

5. The link according to claim 2 wherein said filaments are of glass, aramid, graphite, boron or steel composition 6. The link according to claim 1 wherein said beam is tapered and has a large end portion adjacent said one end of said tube and a small end portion spaced from said tube adjacent said other end, and wherein said bearing means extends outwardly from said small end portion of said beam and engages said second connecting means to permit the same to rotate relative to said beam.

7. The link according to claim 6 wherein said bearing means includes a laminated elastomeric bearing means mounted on said small end of said beam.

8. The link according to claim 7 wherein said laminated elastomeric bearing means includes a radial type elastomeric bearing.

9. The link according to claim 7 wherein said laminated elastomeric bearing means includes a conical type elastomeric bearing.

10. The link according to claim 6 wherein said bearing means includes a pair of elastomeric bearings mounted in axially spaced relation on said small end of said beam.

11. The link according to claim 10 wherein one of said elastomeric bearings is of the radial type and the other is of the conical type.

12. The link according to claim 10 wherein both of said elastomeric bearings are of the radial type.

13. The link according to claim 6 including elastomeric means surrounding said beam and engaging the inside of said tube for a major portion of its length.

14. The link according to claim 1 including means engaging the interior of said tube intermediate its ends for supporting the same transversely while permitting said tube to twist relative to said beam when said torque is applied.

15. The link according to claim 14 wherein said supporting means includes a body of elastomeric material surrounding said beam and engaging between said beam and the inside of said tube.

16. The link according to claim 15 wherein said body of elastomeric material extends along a substantial portion of the length of said tube and engages the beam and inside of said tube therealong.

17. The link according to claim 1 wherein said first connecting means includes an end cap embracing the exterior of said tube and extending axially inward from said one end thereof, and means extending outwardly from said beam for fastening said end cap thereto; and said second connecting means includes a fitting surrounding said other end of said beam and engaging the interior of said tube, and means extending outwardly of said fitting.

18. The link according to claim 17 wherein said fitting has a chamber receiving said other end portion of said beam, and wherein said bearing means includes an elastomeric bearing mounted on said beam in said chamber and engaging said fitting.

19. The link according to claim 18 wherein said elastomeric bearing means includes at least one laminated radial elastomeric bearing.

20. The link according to claim 19 wherein said elastomeric bearing means includes a pair of axially spaced radial elastomeric bearings.

21. The link according to claim 18 wherein said elastomeric bearing means includes a conical laminated elastomeric bearing.

22. The link according to claim 21 wherein said elastomeric bearing means includes a radial laminated elastomeric bearing spaced axially from said conical bearing.

23. The link according to claim 1 including a flexurally stiff tubular cuff surrounding said tube in spaced relation therewith and extending therealong between said first and second connecting means, and bearing means interposed between said cuff and said first connecting means to permit both said second connecting means and said cuff to twist relative to said first connecting means and said beam and to transfer bending induced differential shear loads thereto.

24. The link according to claim 23 wherein said second connecting means includes a fitting engaging the inside of said tube adjacent its other end and a cap embracing said tube and connected to said tubular cuff.

25. A link for use in connecting structural elements, comprising:
a flexurally stiff tapered elongate beam having a predetermined torsional stiffness about a longitudinal axis, said beam having a shaped large end and a small end;
a filament-wound composite tube surrounding said beam and extending therealong in spaced relation therewith, said tube engaging the shaped large end of said beam and being spaced from the small end thereof, said tube being axially stiff and having a torsional stiffness lower than the torsional stiffness of said beam;
first connecting means adapted to connect both said beam and tube at one end to one of said structural elements, said first connecting means including a first end cap surrounding said large end of said beam and tube and means to fasten said end cap to said beam and tube;
second connecting means rotatable about an axis coaxial with said beam axis and adapted to connect said tube at its other end to another of said structural elements, said second connecting means including a fitting having a shaped end engaging the inside of said tube and receiving the small end of said beam, a second end cap surrounding said fitting and tube, and means to fasten said second end cap to said fitting and said tube; and
elastomeric bearing means located between said small end of said beam and said second connecting means fitting for permitting said other end of said tube to rotate relative to said beam when torque is applied to said second end cap and for transferring at least shear loads to said beam,
whereby the beam and tube cooperate with the elastomeric bearing therebetween to provide a connection characterized by low torsional stiffness, high flexural stiffness, and high axial and transverse strength.

26. The link according to claim 25 including a flexurally stiff tubular cuff extending between said first and second end caps, means rigidly connecting said tubular cuff to said second end cap, and laminated elastomeric bearing means interposed between said tubular cuff and said first end cap to permit said second end cap to deflect angularly relative to the first while permitting bending induced differential shear load to be transferred therebetween.

27. The link according to claim 25 including a body of elastomeric material engaged between said beam and said tube for at least a portion of its length to provide internal support for said tube during application of various loads.

28. The link according to claim 25 wherein said shaped ends of said beam and said fitting have complementary substantially hemispheric surfaces and are of substantially the same size, and said tube wraps around said hemispheric surfaces for permitting axial loads to be transferred therebetween.

29. The link according to claim 25 wherein said elastomeric bearing means includes a laminated elastomeric conical bearing connected to said small end of said beam and to said fitting for permitting axial loads to be transferred therebetween.

30. The link according to claim 25 wherein said elastomeric bearing means includes a laminated elastomeric radial bearing connected to said small end of said beam and said fitting for transferring shear loads therebetween.

31. The link according to claim 25 wherein said elastomeric bearing means includes a pair of elastomeric bearings mounted in axially spaced relation between said beam and said fitting for transferring bending loads therebetween.

32. The link according to claim 25 wherein said elastomeric bearing means includes at least one radial laminated elastomeric bearing and at least one conical laminated elastomeric bearing mounted in axially spaced relation between said beam and said fitting for transferring axial, bending and shear loads therebetween.

33. A composite link for use in connecting structural elements, comprising:
a flexurally stiff tapered elongate beam having a large end and a smaller end portion and predetermined torsional stiffness about a longitudinal axis,
a filamentary composite tube surrounding said beam and extending therealong in spaced relation therewith for a major portion of its length, said tube including filaments extending at a low angle with respect to said axis and being bonded together in a flexible matrix, said tube having a torsional stiffness lower than the torsional stiffness of said beam,
first connecting means adapted to connect both said beam and tube at one end to one of said structural elements,
a connecting fitting mounted inside said tube and surrounding said small end of said beam, said fitting being rotatable relative to said beam about an axis coaxial with said beam axis and adapted to connect said tube at its other end to another of said structural elements,
means including shaped end surfaces on said large end of said beam and said fitting for engaging inwardly wrapped portions of said composite tube to permit tensile loads to be applied thereto,
bearing means located between said smaller end portion of said beam and said connecting fitting for permitting said other end of said tube and said connecting fitting to rotate together relative to said beam when torque is applied thereto and for permitting said connecting fitting to transfer shear loads to said beam, and
elastomeric material intermediate said beam and the inside of said tube for elastically supporting the same,
whereby the beam and tube cooperate with the bearing means and end fitting to provide a connection characterized by low torsional stiffness, high flexural stiffness, and high axial and transverse strength.

* * * * *